No. 694,459. Patented Mar. 4, 1902.
J. R. CARTER.
CONNECTING DEVICE.
(Application filed Aug. 7, 1901.)
(No Model.) 2 Sheets—Sheet I.
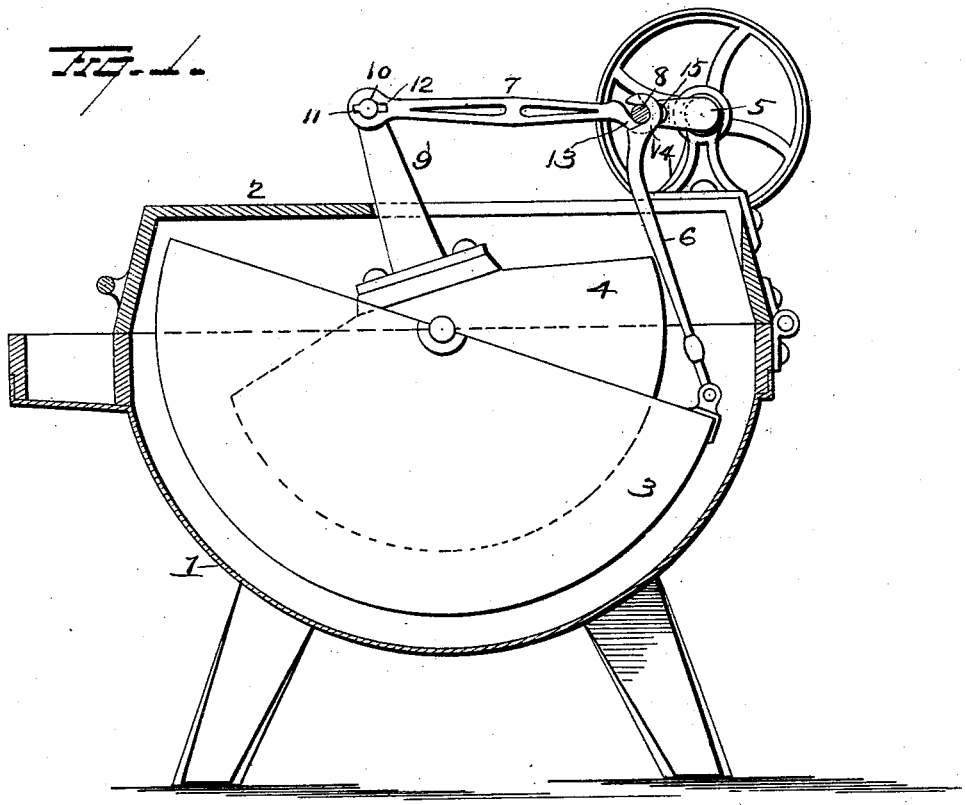
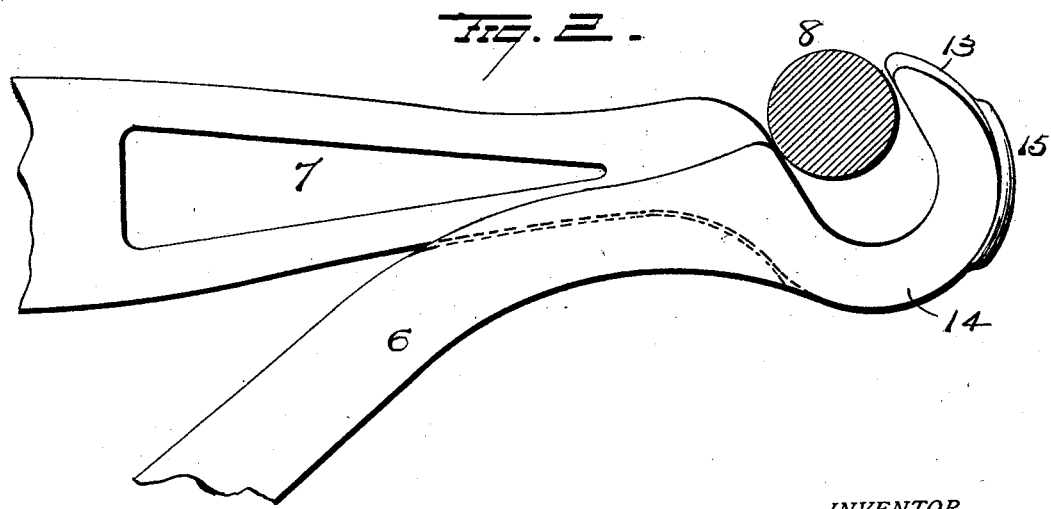
WITNESSES
INVENTOR
John R. Carter
By H. A. Seymour,
Attorney

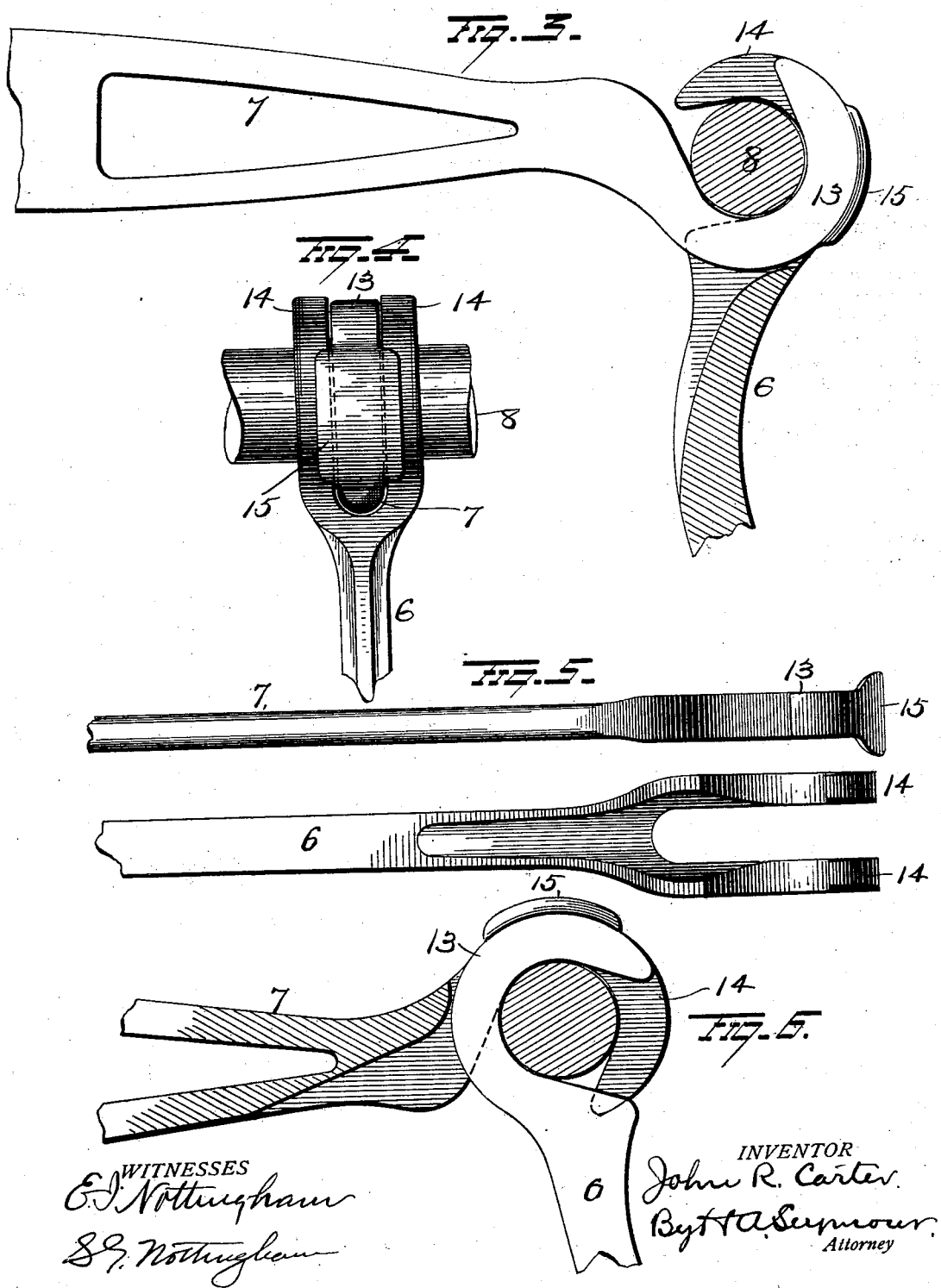

UNITED STATES PATENT OFFICE.

JOHN R. CARTER, OF AUGUSTA, KENTUCKY, ASSIGNOR TO ERNST H. HUENEFELD, OF CINCINNATI, OHIO.

CONNECTING DEVICE.

SPECIFICATION forming part of Letters Patent No. 694,459, dated March 4, 1902.

Application filed August 7, 1901. Serial No. 71,266. (No model.)

*To all whom it may concern:*

Be it known that I, JOHN R. CARTER, of Augusta, in the county of Bracken and State of Kentucky, have invented certain new and useful Improvements in Connecting Devices; and I do hereby declare the following to be a full, clear, and exact description of the invention, such as will enable others skilled in the art to which it appertains to make and use the same.

My invention relates to an improvement in connecting devices, and more particularly to means for connecting two pitmen with a single crank-shaft in such manner as to permit their easy removal but which will effectually hold them in position when in operation.

With this object in view the invention consists in certain novel features of construction and combinations and arrangements of parts, as will be more fully hereinafter described, and pointed out in the claims.

In the accompanying drawings, Figure 1 is a view illustrating my improvements on a washing-machine. Figs. 2, 3, and 4 are enlarged views illustrating the various positions of the connection. Fig. 5 is a plan view of the pitmen separated, and Fig. 6 is a view illustrating a modified form of my invention.

1 represents the body of the washing-machine, and 2 the cover therefor. A lower rubber 3 is mounted to reciprocate in the body 1 and coöperates with an upper rubber 4, also mounted to operate, but in a reverse direction, in said body. A crank-shaft 5 is mounted on the cover of the body 1, and its crank-arm 8 is connected by a pitman 6 with the lower rubber 3. Another pitman 7 is connected at one end with crank-arm 8 of said shaft 5 and at its other end with an upright or lever 9, projecting upward from the upper rubber and located in an elongated slot in the cover 2. It is to the connection between these pitmen and the crank-shaft that my present invention has particular reference.

The upright or lever 9 is provided on one side, at its upper end, with a stud or pintle 10 to receive one end of pitman 7, and said stud is provided at its outer end, on one side, with a lug or key 11 to aline with a keyway 12 in the pitman 7 when the latter is in a horizontal position and pointing away from the crank-shaft 5, and when the pitman is inserted on the stud it is thrown around to point toward the crank-shaft, and hence cannot become disconnected from the stud during the operation of the washer. The free end of this pitman 7 is provided with a hook 13, adapted to be placed on the crank-arm 8 of shaft 7, and the end of the other pitman 6 is made with double hooks 14, spaced apart sufficiently to receive the hook 13 between them, when all of said hooks will aline and can be inserted on the crank-arm 8. After said hooks are inserted on the crank-arm the pitman 6 is pivotally swung on the crank-arm to move the double hooks 14 out of alinement with the single hook 13 and is then attached to the lower rubber.

To prevent the outward movement of the double hooks from off the crank-arm, I provide the outer portion of the single hook 13 with an enlargement 15 to engage the outer portion of one or both of the double hooks, hence securely holding the same on the shaft. This enlargement 15 may be made in various ways—as, for instance, it might consist of an enlargement overlapping the outer edges of both double hooks, as shown, or it might consist of making the outer wall of the single hook 13 of greater width than its inner wall and beveling the inner faces of the double hook to receive the same. Hence I do not wish to be limited to the particular enlargement shown.

In assembling the parts the pitman 7 is first connected to the upright or lever 9, as above explained. The double hooks 14 on the end of pitman 6 are then inserted onto the single hook 13, so that they aline, and all the hooks are inserted on the lower half of the crank-arm, when the pitman 6 is turned on the crank-arm, its free end falling down through the slot in cover 2 and attached to the lower rubber 3, and when in this position the hooks will be out of alinement and their separation from the crank-arm prevented by the enlargement 15, as above explained.

By employing the double hooks 14 to receive between them the single hook 13 it is not necessary to employ shoulders on the crank-arm to hold them against lateral movement, as neither can move laterally without the other, and hence a perfect joint is assured without the aid of other means.

If desired, the double hooks can be provided on pitman 7 and the single hook on pitman 6, and when so provided the hooks are assembled and first placed on the upper half of the crank-arm, as shown in Fig. 6.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a double-pitman connection the combination of two pitmen, one having double hooks spaced apart and adapted to receive a shaft, the other pitman having a single hook to be disposed on the shaft between the double hooks and the outer portion of the single hook having an enlargement to engage the hook portion of the pitman having double hooks and lock both pitmen on the shaft when the hooks are moved out of alinement.

2. In a double-pitman connection, the combination of two pitmen and a shaft, one pitman having double hooks spaced apart and adapted to receive the shaft, the other pitman having a single hook to be disposed on the shaft between the double hooks and the outer portion of the single hook having lateral enlargements to overlap the outer edges of the double hooks when the hooks are moved out of alinement.

In testimony whereof I have signed this specification in the presence of two subscribing witnesses.

JOHN R. CARTER.

Witnesses:
S. W. FOSTER,
G. F. DOWNING.